United States Patent
Nishikawa et al.

(10) Patent No.: US 8,173,715 B2
(45) Date of Patent: May 8, 2012

(54) POLYURETHANE RESIN MOULDING FOR VEHICLE INTERIOR PART AND METHOD OF MANUFACTURING THE SAME

(75) Inventors: Shinji Nishikawa, Amagasaki (JP); Fumihiko Noda, Amagasaki (JP); Kazuyuki Endo, Fuji (JP)

(73) Assignees: Nihon Plast Co., Ltd., Fuji-Shi (JP); Sumika Bayer Urethane Co., Ltd., Kita-Ku (JP)

( * ) Notice: Subject to any disclaimer, the term of this patent is extended or adjusted under 35 U.S.C. 154(b) by 215 days.

(21) Appl. No.: 12/472,776

(22) Filed: May 27, 2009

(65) Prior Publication Data

US 2009/0298959 A1 Dec. 3, 2009

(30) Foreign Application Priority Data

May 27, 2008 (JP) ................. P2008-137552

(51) Int. Cl.
*C08G 18/06* (2006.01)

(52) U.S. Cl. ...... 521/99; 264/45.1; 428/423.1; 521/134; 521/137; 521/170; 528/85

(58) Field of Classification Search ............. 521/99, 521/134, 137, 170; 528/85; 264/45.1; 428/423.1
See application file for complete search history.

(56) References Cited

U.S. PATENT DOCUMENTS

| 4,095,985 A | * | 6/1978 | Brown | 106/18.11 |
| 5,677,048 A | * | 10/1997 | Pushaw | 428/320.2 |
| 2003/0100623 A1 | * | 5/2003 | Kaku et al. | 521/155 |

FOREIGN PATENT DOCUMENTS

| JP | 11263872 | 9/1999 |
| JP | 2002000399 | 1/2002 |
| JP | 2007168550 | 7/2007 |
| WO | WO 2008/116763 | * 10/2008 |

* cited by examiner

*Primary Examiner* — John Cooney
(74) *Attorney, Agent, or Firm* — NDQ&M Watchstone LLP

(57) ABSTRACT

A method of manufacturing a polyurethane resin moulding for a vehicle interior part, includes: adding at least one of a polyol mixture and a polyisocyanate compound to at least one of microencapsulated paraffin waxes and shirasu balloons, followed by polymerizing the polyol mixture and the polyisocyanate compound. The polyol mixture contains a polyol, a catalyst, a chain extender and an auxiliary agent. A melting point of the microencapsulated paraffin waxes is 60° C. to 80° C.

6 Claims, 1 Drawing Sheet

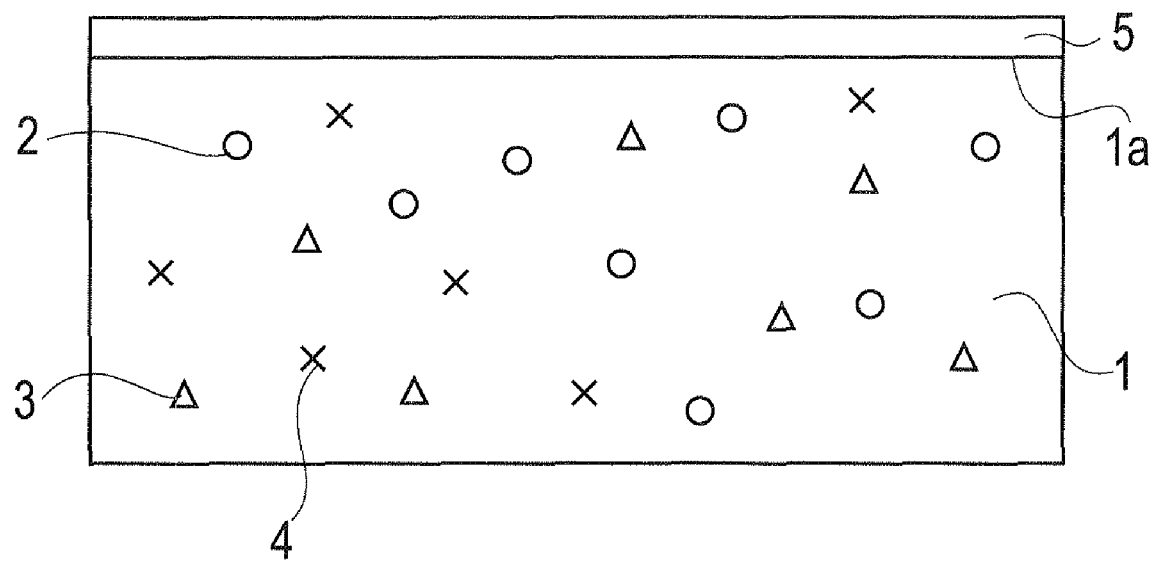

POLYURETHANE RESIN MOULDING FOR VEHICLE INTERIOR PART AND METHOD OF MANUFACTURING THE SAME

BACKGROUND OF THE INVENTION

1. Field of the Invention

The present invention relates to a polyurethane resin moulding for a vehicle interior part and a method of manufacturing the same. Specifically, the present invention relates to a polyurethane resin moulding capable of suppressing a rise of a temperature on a surface of a vehicle interior part and a maximum surface temperature compared with a conventional art when the vehicle interior part is exposed to direct sunlight, and capable of lessening hotness when a passenger touches the surface of the vehicle interior part, and relates to the method of manufacturing the polyurethane resin moulding for the vehicle interior part.

2. Description of the Related Art

Generally, when parking a vehicle outside and receiving direct sunlight for a prolonged time especially in summer, a room temperature in the vehicle reaches nearly 80° C. A surface temperature of a polyurethane resin moulding for a vehicle interior part and the like increases as the room temperature increases. For instance, a surface temperature of a steering wheel reaches nearly 80° C. Although an air conditioner, for instance, is actuated to lower the room temperature so as to get into the vehicle, the surface temperature of the steering wheel is not lowered immediately while the room temperature is lowered relatively easily. Therefore, a substantial amount of time is required until the surface temperature of the steering wheel is lowered so as to hold and operate the steering wheel.

Thus, conventionally, it has been required to lessen hotness when a passenger touches the surface of the steering wheel, i.e. suppress the temperature rise on the surface of the steering wheel and decrease the maximum surface temperature. The following method has been suggested as the method of suppressing the rise of the temperature on the surface of the polyurethane resin moulding.

Japanese Patent Unexamined Publication No. H11-263872 describes a method combined with a thermal barrier coating and an infrared absorption pigment for a mold coating. In this method, it is possible to suppress a rise of an atmosphere temperature around a product by avoiding an influence of infrared light reflected by air convection in open space. While, a surface temperature of a product in closed space in a vehicle decreases only by 1 to 2° C. since the atmosphere temperature in the vehicle increases as time passes because of almost no air convection. Accordingly, there is little difference with regard to hotness when touching the surface of the product compared to a product not employing the thermal barrier coating and the infrared absorption pigment.

Japanese Patent Unexamined Publication No. 2002-000399 describes an example using a heat storage material. A melting point of the heat storage material is determined to be between 10 to 35° C. lower than human body temperature. Thus, in view of a relationship between room temperature and human body temperature, a mechanism to maintain a certain temperature around the melting point of the heat storage material is adopted so as to feel cool in summer and feel warm in winter. However, an effect of the heat storage material is hardly expected in closed space in a vehicle where the room temperature reaches nearly 80° C.

Japanese Patent Unexamined Publication No. 2007-168550 describes an example using shirasu balloons in order for heat insulation. However, the shirasu balloons are used for a heat insulation coating used for outer walls of a freezer of a refrigerator car, of which an intended purpose is considerably different from the present invention.

BRIEF SUMMARY OF THE INVENTION

As described above, the rise of the surface temperature and the maximum surface temperature could not be suppressed to a low level in the conventional polyurethane resin mouldings when the room temperature in the vehicle reaches nearly 80° C., such as in summer.

The present invention has been made in consideration for such problems inherent in the conventional technology. It is an object of the present invention to provide a polyurethane resin moulding for a vehicle interior part capable of suppressing a rise of a surface temperature of the vehicle interior part and a maximum surface temperature when a vehicle parking outside is exposed to direct sunlight for a prolonged time especially in summer, and capable of keeping an effect of the suppression and lessening hotness or coldness when touching the surface of the vehicle interior part, and provide a method of manufacturing the polyurethane resin moulding for the vehicle interior part.

The first aspect of the present invention provides a method of manufacturing a polyurethane resin moulding for a vehicle interior part. The method includes: adding at least one of a polyol mixture and a polyisocyanate compound to at least one of microencapsulated paraffin waxes and shirasu balloons, followed by polymerizing the polyol mixture and the polyisocyanate compound. The polyol mixture contains a polyol, a catalyst, a chain extender and an auxiliary agent, and a melting point of the microencapsulated paraffin waxes is 60° C. to 80° C.

The second aspect of the present invention provides the method of manufacturing the polyurethane resin moulding for the vehicle interior part according to the first aspect, wherein at least one of the microencapsulated paraffin waxes and the shirasu balloons are added to the polyol mixture.

The third aspect of the present invention provides the method of manufacturing the polyurethane resin moulding for the vehicle interior part according to the first aspect, wherein a particle diameter of the shirasu balloons is 35 μm to 80 μm.

The fourth aspect of the present invention provides the method of manufacturing the polyurethane resin moulding for the vehicle interior part according to the first aspect, wherein the polyol mixture further contains thermal barrier pigments.

The fifth aspect of the present invention provides the method of manufacturing the polyurethane resin moulding for the vehicle interior part, further including: after the preparation of the polyurethane resin moulding, applying a thermal barrier coating to a surface of the obtained polyurethane resin moulding with a thickness of 10 μm to 100 μm.

The sixth aspect of the present invention provides a polyurethane resin moulding for a vehicle interior part. The moulding includes: a polyurethane resin; more than 0 to not more than 28.7% by weight of microencapsulated paraffin waxes of which a melting point is at least 60° C. to 80° C.; and more than 0 to not more than 21.5% by weight of shirasu balloons.

BRIEF DESCRIPTION OF THE SEVERAL VIEWS OF THE DRAWING

FIG. 1 is an enlarged cross-sectional view showing one example of a polyurethane resin moulding for a vehicle interior part according to an embodiment of the present invention.

DETAILED DESCRIPTION OF THE INVENTION

Hereinafter, description will be made below in detail of a polyurethane resin moulding for a vehicle interior part of the present invention with reference to the drawing.

The polyurethane resin moulding according to an embodiment of the present invention can be applied to a vehicle interior part such as an instrument panel, a door trim (upper part), a headrest, an armrest, a gear lever knob, and a steering wheel. Moreover, the polyurethane resin moulding is capable of suppressing a rise of a surface temperature and a maximum surface temperature compared with a conventional art when the moulding is exposed to direct sunlight, and capable of keeping an effect of the suppression (constant temperature retention) and lessening hotness when a passenger touches the surface of the moulding.

[Raw Materials of Polyurethane Resin Moulding]

First, raw materials of the polyurethane resin moulding according to the embodiment of the present invention will be described. A polyurethane resin is composed of a polyol mixture containing a polyol, a catalyst, a chain extender and an auxiliary agent, and a polyisocyanate compound. Also, a blowing agent may be used if necessary.

As the polyisocyanate compound used in the present invention, diphenylmethane diisocyanate, polymethylene polyphenyl polyisocyanate, toluene diisocyanate, hexamethylene diisocyanate, isophorone diisocyanate, and a mixture of those are included. In addition, urethane-modified polyisocyanate, allophanate-modified polyisocyanate, carbodiimide-modified polyisocyanate or isocyanate-modified polyisocyanate, and a mixture of those can be used.

As the polyol, a hydroxyl group-containing compound such as propylene glycol, diethylene glycol, glycerin, trimethylolpropane, pentaerythritol, sorbitol and sucrose can be used. In addition, compounds including an amino group and hydroxyl group such as triethanolamine and diethanolamine, can be used. Also, polyether polyol including 2 to 6 of hydroxyl groups in a molecule and having an average hydroxyl group equivalent of 100 to 2400 (hydroxyl number of 561 to 23 mgKOH/g) can be used. In the polyether polyol, alkylene oxide such as ethylene oxide and propylene oxide is attached to an amino group-containing compound such as ethylenediamine and diaminotoluene. Moreover, polymer polyol in which a vinyl compound is addition-polymerized to the above-mentioned polyether polyol can be used.

As the catalyst, tertiary amine such as triethylenediamine, pentamethyldiethylenetriamine, dimethylaminoethanol, tetramethylethylenediamine, dimethylbenzylamine, tetramethylhexamethylenediamine, bis(2-dimethylaminoethyl)ether, 1-methylimidazole and 1-isobutyl-2-methylimidazole can be used. In addition, an organometallic compound such as dibutyltin dilaurate, tin octanoate and dibutyltin diacetate can be used. It is preferable to add 0.1 to 5.0 parts by weight of the catalyst to 100 parts by weight of the polyol mixture. It is more preferable to add 0.3 to 1.8 parts by weight of the catalyst to 100 parts by weight of the polyol mixture.

As the chain extender (crosslinking agent), a divalent alcohol with a molecular weight of 61 to 300 such as ethylene glycol, propylene glycol, butanediol, 1,3-butanediol, hexanediol, diethylene glycol, triethylene glycol, polyethylene glycol, dipropylene glycol and polypropylene glycol is appropriately used. In addition, a divalent amine such as diethyltoluenediamine, t-butyltoluenediamine, diethyldiaminobenzene, triethyldiaminobenzene and tetraethyldiaminodiphenylmethane is appropriately used. It is preferable to add 1.0 to 20.0 parts by weight of the chain extender to 100 parts by weight of the polyol mixture. It is more preferable to add 5.0 to 10.0 parts by weight of the chain extender to 100 parts by weight of the polyol mixture.

As the blowing agent, an agent except chlorofluorocarbon is appropriately used. For instance, water, carbonate of an amine compound or formic acid is used.

As the other auxiliary agent, a foam stabilizer such as a silicone foam stabilizer and a surfactant, a weathering stabilizer such as an antioxidant, an ultraviolet absorbent, a photostabilizer and coloring agent are appropriately used.

A latent heat storage material used in the present invention, such as microencapsulated paraffin wax particles, shirasu balloons, thermal barrier pigments and the like, may be added to any of the polyurethane resin raw materials. In other words, the latent heat storage material may be added to the polyol mixture formed by mixing the polyol, the catalyst, the chain extender and the auxiliary agent, and may be added to the polyisocyanate compound. Also, the latent heat storage material may be added to both the polyol mixture and the polyisocyanate compound. Preferably, the latent heat storage material is added to the polyol mixture since the latent heat storage material can be uniformly dispersed in the polyol mixture compared to the polyisocyanate compound.

The present invention adopts the microencapsulated paraffin waxes of which the melting point is 60 to 80° C. is microencapsulated. The paraffin waxes change from a solid to a liquid when a temperature in a vehicle becomes high. Then, the paraffin waxes absorb heat due to an endothermic reaction at the transformation, and store the absorbed heat. As the microencapsulated paraffin waxes, a commercial product such as Prethermo C series (manufactured by Daiwa Chemical Industries Co., Ltd.) can be used. It is preferable to add 1 to 40 parts by weight of the microencapsulated paraffin waxes to 100 parts by weight of the polyol mixture. It is more preferable to add 1 to 20 parts by weight of the microencapsulated paraffin waxes to 100 parts by weight of the polyol mixture.

The present invention adopts the shirasu balloons that are foam obtained by instantaneously heating volcanic ash (shirasu) at approximately 1000° C., and have particulate hollow bodies foamed in the process of heating volcanic ash. As for the shirasu balloons, a commercial product, such as Five Star manufactured by SKlife Co., Ltd., can be also used. A particle diameter of the shirasu balloons is preferably 35 µm to 80 µm. It is preferable to add 0 to 30 parts by weight of the shirasu balloons to 100 parts by weight of the polyol mixture. It is more preferable to add 5 to 30 parts by weight of the shirasu balloons to 100 parts by weight of the polyol mixture. While, when more than 30 parts by weight of the shirasu balloons are added to the polyol mixture, there may be a problem with mixing performance when being molded by means of a reaction injection moulding since an effect of addition is saturated and viscosity of the polyol mixture is increased.

It is preferable to add 0.5 to 3 parts by weight of the thermal barrier pigments to 100 parts by weight of the polyol mixture. When the thermal barrier pigments are less than 0.5 parts by weight, the effect is not sufficient. While, when the thermal barrier pigments are more than 3 parts by weight, the effect may be saturated. The thermal barrier pigments can be dispersed into the polyol mixture same as general pigments, and can be used by being modified in paste form.

The thermal barrier pigments that have a high reflection peak around 1000 nm of an infrared wavelength range (near-infrared range) are preferable. As the thermal barrier pigments, AB820 manufactured by Kawamura Chemical Co., Ltd. can be included. In addition, the thermal barrier pigments that have a high reflection peak above 1100 nm of the infrared wavelength range (far-infrared range) are also preferable. As the thermal barrier pigments, AG235 manufactured by Kawamura Chemical Co., Ltd. can be included.

The thermal barrier coating is preferably applied to a surface of the obtained polyurethane resin moulding with a thickness of 10 μm to 100 μm. When the thickness of the thermal barrier coating is between 10 μm and 100 μm, it is possible to achieve a heat insulating effect capable of suppressing the surface temperature of the moulding provided with the pigments. When the thickness is less than 10 μm, the heat insulating effect is not sufficient. While, when the thickness is more than 100 μm, the heat insulating effect may be saturated. Preferably, the thermal barrier coating with a high reflection peak around 1000 nm of the infrared wavelength range (near-infrared range) is used.

[Manufacturing Method of Polyurethane Resin Moulding]

A manufacturing method of the polyurethane resin moulding according to the embodiment of the present invention will be described.

First, the polyol mixture is prepared by mixing the polyol, the catalyst, the chain extender and the auxiliary agent. The amount of the polyol, the catalyst, the chain extender and the auxiliary agent can be appropriately adjusted according to the desired property of the polyurethane resin moulding.

Next, at least one of the microencapsulated paraffin waxes and the shirasu balloons is added to at least one of the polyol mixture and the polyisocyanate compound, followed by dispersing.

Next, the polyol mixture and the polyisocyanate compound are mixed by use of a mixing device. As the mixing device, a mechanical agitator to mix the raw materials by rotating agitating blades in a chamber, and a high-pressure agitator to mix by ejecting the raw materials from nozzles can be used.

Then, the polyol mixture and the polyisocyanate compound are polymerized by use of a moulding machine, followed by moulding. In other words, the mixture can be molded desirably by the moulding machine since a polymerization of the mixture is started in a few seconds, and the mixture becomes solid in several tens of seconds to a few minutes.

With regard to the moulding method at manufacturing the polyurethane resin, a generally-known open filling method to fill a lower mold first with a mixture (polyurethane resin liquid) while opening an upper mold, followed by closing the upper mold is used. Also, the reaction injection moulding (RIM) such as a closed filling method to fill upper and lower molds with a mixture with the molds preliminarily closed is used. Especially, the reaction injection moulding is preferable in the method of moulding the polyurethane resin raw materials for a vehicle interior part. A steering wheel is preferably molded by the reaction injection moulding since the steering wheel is made by a short time moulding cycle, which has, for instance, a reactivity capable of being demoulded in a minute to three minutes after filling (rise time is between 20 to 60 seconds).

With regard to the manufacture (moulding) of the polyurethane resin by RIM, a reaction injection moulding machine such as a high-pressure polyurethane moulding machine for R-RIM manufactured by Hennecke Inc., and a high-pressure polyurethane moulding machine for R-RIM manufactured by Polyurethane Engineering Co., Ltd. can be used.

In the manufacture (moulding) of the polyurethane resin of the present invention, an acceptable NCO index is within a range from 90 to 130. Preferably, the NCO index is from 100 to 115. When the NCO index is below 90, polyol is excessive. While, when the NCO index is above 130, isocyanate is excessive. With regard to a steering wheel, for example, when the NCO index is below 90, there may be a problem with resistance to abrasion, weather, and the like. While, when the NCO index is above 130, the surface of the steering wheel is cured and reduced elasticity and flexibility that are characteristics of the polyurethane steering wheel.

Note that, the NCO index is obtained by multiplying 100 by a ratio (equivalent ratio) of the amount of the polyol mixture and water per active hydrogen in the polyol mixture when using water as a blowing agent and the amount of polyisocyanate per isocyanate group in polyisocyanate.

The polyurethane resin moulding for the vehicle interior part molded as described above includes at least one of microencapsulated paraffin waxes 2 of which a melting point is 60 to 80° C. and shirasu balloons 3 as shown in FIG. 1. In this case, more than 0 to not more than 28.7% by weight, preferably 0.60 to 14.4% by weight of the microencapsulated paraffin waxes 2 of which the melting point is 60 to 80° C. are contained. In addition, more than 0 to not more than 21.5% by weight, preferably 3.2 to 21.5% by weight of the shirasu balloons 3 are contained. Moreover, 0.32 to 2.2% by weight of thermal barrier pigments 4 are appropriately contained. Furthermore, a thermal barrier layer 5 may be appropriately formed on a surface 1a of a polyurethane resin 1 by applying a thermal barrier coating with a thickness of 10 μm to 100 μm.

The above-mentioned polyurethane resin moulding is capable of suppressing a rise of a surface temperature and keeping an effect of suppression (constant temperature retention). In other words, when a vehicle is parked outside especially in summer, a room temperature in the vehicle reaches nearly 80° C. Conventionally, an air conditioner and the like of the vehicle has been actuated to lower the temperature just after getting into the vehicle under such a condition since a surface temperature of a steering wheel and the like is high. While, in the moulding of the present invention, it is not necessary to actuate the air conditioner and the like for a prolonged time, and therefore, it is possible to eliminate wasting time and reduce energy consumption since it is possible to suppress the rise of the surface temperature and keep the effect of suppression due to the moulding.

Especially, it is assumed that the above-mentioned effect is obtained due to the following mechanism. The above-mentioned moulding includes the microencapsulated paraffin waxes of which the melting point is 60 to 80° C. as a latent heat storage material. Therefore, when the room temperature in the vehicle reaches nearly 80° C., the paraffin wax in the microcapsules change from a solid to a liquid. Then, the paraffin waxes absorb heat due to the endothermic reaction and store the absorbed heat. Thus, it is possible to suppress the surface temperature to a low level and keep the effect of suppression.

In addition, the shirasu balloons are fine hollow foamed particles having low heat conductivity. Therefore, the moulding is provided with a heat insulating effect, so that heat transfer is slowed. Thus, it is possible to suppress the surface temperature to a low level.

Moreover, the thermal barrier coating is preferably applied to a surface of the moulding to form the thermal barrier layer. As the thermal barrier layer, a coating material, in which hollow ceramic balloons, shirasu balloons, ceramic beads and the like are mixed, can be used. The hollow ceramic balloons, shirasu balloons, ceramic beads and the like are capable of suppressing the surface temperature by reflecting light, and show high reflectance in a near-infrared range (780 nm to 2100 nm) occupying 50% of sunlight. Due to the applied thermal barrier coating, effects of the three factors, heat absorption, heat insulation and thermal barrier (reflection) enhance, so that the polyurethane resin moulding, such as a steering wheel, that lessens hotness when touching the surface of the moulding and has not been achieved in the conventional technology can be obtained.

Note that, the scope of the present invention is not limited to the embodiment that achieves the effect by the above-mentioned mechanism.

The present invention will be illustrated in further detail by the following Examples and Comparative Examples; however, the scope of the invention is not limited to these Examples. Hereinafter, "parts" and "%" represent "parts by weight" and "% by weight" respectively unless otherwise specified.

| [Raw materials (polyol mixture, blowing agent and polyisocyanate compound) of polyurethane resin for steering wheel and moulding conditions] | |
|---|---|
| (1) Polyol mixture | |
| Polyether polyol | 90 parts (hydroxyl number of 35 mgKOH/g, manufactured by adding propylene oxide and ethylene oxide to glycerin) |
| Ethylene glycol | 6.1 parts |
| Ethylene glycol solution containing 33% of triethylenediamine | 0.15 parts |
| Dibutyltin dilaurate | 0.01 parts |
| Toyocat ET | 1.3 parts |
| Silicone foam stabilizer | 0.02 parts |
| Coloring agent | 1.8 parts |
| (2) Water | 0.35 parts |
| (3) Polyisocyanate compound | |
| Carbodiimide-modified diphenylmethane diisocyanate (29% of NCO content, viscosity of 40 mPa · s/25° C.) | |
| (4) Used amount of (3) polyisocyanate compound with respect to a total of 100 parts of (1) polyol mixture and (2) water | 45.8 parts (NCO index 105) |
| (5) Reactivity (rise time): | 33 seconds |
| Hand mixing | |
| Polyethylene container foaming (free rised foam) | |
| Raw material temperature of polyurethane resin: | 25° C. |
| (6) Moulding conditions | |
| Stirring and mixing in polyethylene container by hand mixing, followed by filling mold (open filling) | |
| Raw material temperature of polyurethane resin: | 25° C. |
| Mold: | flat mold made of steel (mold size: 200 × 200 × 10 mm) |
| Moulding temperature: | 60° C. |
| Demoulding time: | demoulding the product from mold 120 seconds after filling the raw material |
| Moulding density: | 0.5 g/cm$^3$ |

[Evaluation Method of Polyurethane Resin Moulding]

(1) Inside conditions of a vehicle were reproduced by use of an infrared irradiation test device (TBE-2HW-2G6C, manufactured by Shimadzu Corporation), and sample mouldings were placed under the conditions so as to perform evaluations. A setting temperature is assumed as a surface temperature of an interior part installed in a car. An atmosphere temperature was 20° C. lower than the setting temperature when reaching the setting temperature.

| Temperature rise rate: | 25° C. to 80° C. | 30 minutes |
|---|---|---|
| Holding time: | | 30 minutes |
| Temperature fall rate: | 80° C. to 25° C. | 30 minutes |

The surface temperatures of the sample mouldings were measured per hour. The lower surface temperature represents the higher effect. Also, the lower surface temperature after the 30-minute holding time represents the higher persistence of the suppressing effect.

(2) Measurement of heat transfer flow rate (Q-MAX) (Finger Robot Thermo Labo KES-F7, manufactured by Kato Tech Co., Ltd.)

Test Conditions

Each of the sample mouldings is placed in a constant temperature reservoir at 80° C. for 30 minutes, followed by removing from the reservoir and measuring the Q-MAX by bringing a sensor in contact with each surface. The higher the Q-MAX is, the hotter the surface is. A surface temperature of the sensor is set at 35° C. on the assumption of a human body temperature. The Q-MAX under the setting conditions can be used to approximately evaluate levels of hotness when touching the sample mouldings with passenger's fingers.

EXAMPLE 1

10 parts (6.4% by weight in a polyurethane resin moulding) of a latent heat storage material, Prethermo C-75 (manufactured by Daiwa Chemical Industries Co., Ltd.), that paraffin waxes (PW) of which a melting point was 75° C. were microencapsulated as shown in Table 1 were added to 100 parts of a polyol mixture. Then, a moulding was obtained based on the raw materials of the polyurethane resin for a steering wheel and the moulding conditions as described above. Hereinafter, the latent heat storage material that the paraffin waxes are microencapsulated is described as "microencapsulated PW".

COMPARATIVE EXAMPLES 1 to 4

The same operations as Example 1 were repeated except that each of 10 parts (6.4% by weight in a polyurethane resin moulding) of respective microencapsulated PW of which each melting point was 9° C., 31° C. and 58° C., and 10 parts of paraffin waxes (PW) not microencapsulated of which a melting point was 83° C. as shown in Table 1 were added to 100 parts of a polyol mixture, respectively, whereby each moulding was obtained.

TABLE 1

| No. | Microencapsulated PW and PW | Melting Point (° C.) | Particle Diameter (μm) | Major Component | Manufacturer |
|---|---|---|---|---|---|
| Example 1 | Prethermo C-75 | 75 | 10 to 100 | Paraffin-base WAX | Daiwa Chemical Industries Co., Ltd. |
| Comparative Example 1 | Prethermo C-9 | 9 | 10 to 100 | Paraffin-base WAX | Daiwa Chemical Industries Co., Ltd. |
| Comparative Example 2 | Prethermo C-31 | 31 | 10 to 100 | Paraffin-base WAX | Daiwa Chemical Industries Co., Ltd. |
| Comparative Example 3 | Prethermo C-58 | 58 | 10 to 100 | Paraffin-base WAX | Daiwa Chemical Industries Co., Ltd. |
| Comparative Example 4 | WAX-2191 | 83 | 10 to 100 | Paraffin-base WAX | Nippon Seiro Co., Ltd. |

With regard to the sample mouldings of Example 1 and Comparative Examples 1 to 4, Table 2 shows test results evaluating temperature differences between the setting temperature and each surface temperature of the sample mouldings when the temperature in the vehicle reaches 80° C. under the above-mentioned temperature rise conditions. Moreover, Table 2 shows test results evaluating temperature differences between the setting temperature and each surface temperature of the sample mouldings after keeping the setting temperature in the vehicle at 80° C. for 30 minutes.

TABLE 2

| No. | Microencapsulated PW and PW | Temperature Difference from Setting Temperature (80° C.) at Reaching 80° C. (° C.) | Temperature Difference from Setting Temperature (80° C.) after Holding Time (30 minutes) at 80° C. (° C.) |
|---|---|---|---|
| Example 1 | Prethermo C-75 | 10 | 4 |
| Comparative Example 1 | Prethermo C-9 | 4 | 0 |
| Comparative Example 2 | Prethermo C-31 | 4 | 0 |
| Comparative Example 3 | Prethermo C-58 | 6 | 2 |
| Comparative Example 4 | WAX-2191 | 6 | 1 |

EXAMPLES 2 to 4

20 parts (12.1% by weight in a polyurethane resin moulding) of the microencapsulated PW of which the melting point was 75° C. used in Example 1 were added to 100 parts of a polyol mixture in Example 2, 30 parts (17.1% by weight in a polyurethane resin moulding) of the above-mentioned microencapsulated PW were added to 100 parts of the polyol mixture in Example 3, and 40 parts (21.5% by weight in a polyurethane resin moulding) of the above-mentioned microencapsulated PW were added to 100 parts of the polyol mixture in Example 4, whereby each moulding was obtained by the same operations as Example 1. Table 3 shows test results of Examples 2 to 4 with the addition of a test result of Comparative Example 5 of which a moulding was obtained by the same operations as Example 1 except that the microencapsulated PW were not added.

TABLE 3

| No. | Microencapsulated PW and PW | Temperature Difference from Setting Temperature (80° C.) at Reaching 80° C. (° C.) | Temperature Difference from Setting Temperature (80° C.) after Holding Time (30 minutes) at 80° C. (° C.) |
|---|---|---|---|
| Example 2 | 20 Parts of Prethermo C-75 | 14 | 4 |
| Example 3 | 30 Parts of Prethermo C-75 | 14 | 4 |
| Example 4 | 40 Parts of Prethermo C-75 | 15 | 5 |
| Comparative Example 5 | No addition of Microencapsulated PW | 6 | 0 |

EXAMPLES 5 and 6

5 parts (3.2% by weight in a polyurethane resin moulding) of the microencapsulated PW of which the melting temperature was 75° C. used in Example 1 and 5 parts (3.2% by weight in a polyurethane resin moulding) of shirasu balloons with a diameter of 35 μm were added to 100 parts of a polyol mixture in Example 5. 5 parts of the above-mentioned microencapsulated PW and 5 parts (3.2% by weight in a polyurethane resin moulding) of shirasu balloons with a diameter of 80 μm were added to 100 parts of a polyol mixture in Example 6. Each moulding was obtained by the same operations as Example 1. Table 4 shows test results of the examples.

TABLE 4

| No. | Microencapsulated PW and PW | Temperature Difference from Setting Temperature (80° C.) at Reaching 80° C. (° C.) | Temperature Difference from Setting Temperature (80° C.) after Holding Time (30 minutes) at 80° C. (° C.) |
|---|---|---|---|
| Example 5 | 5 Parts of Prethermo C-75 + 5 Parts of Shirasu balloons 35 | 10 | 3 |

TABLE 4-continued

| No. | Microencapsulated PW and PW | Temperature Difference from Setting Temperature (80° C.) at Reaching 80° C. (° C.) | Temperature Difference from Setting Temperature (80° C.) after Holding Time (30 minutes) at 80° C. (° C.) |
|---|---|---|---|
| Example 6 | 5 Parts of Prethermo C-75 + 5 Parts of Shirasu balloons 80 | 10 | 3 |
| Example 1 | 10 Parts of Prethermo C-75 | 11 | 3 |

EXAMPLES 7 to 9

The same operations as Example 1 were repeated except that 10 parts (6.4% by weight in a polyurethane resin moulding) of shirasu balloons with a diameter of 80 μm were added to 100 parts of a polyol mixture in Example 7, 20 parts (12.1% by weight in a polyurethane resin moulding) of the above-mentioned shirasu balloons were added to 100 parts of the polyol mixture in Example 8, and 30 parts (17.1% by weight in a polyurethane resin moulding) of the above-mentioned shirasu balloons were added to 100 parts of the polyol mixture in Example 9, instead of the addition of the microencapsulated PW in each example, whereby each moulding was obtained. Table 5 shows test results of Examples 7 to 9 with the addition of a test result of Comparative Example 5 to which neither microencapsulated PW nor shirasu balloons were added.

TABLE 5

| No. | Additive Amount of Shirasu balloons | Temperature Difference from Setting Temperature (80° C.) at Reaching 80° C. (° C.) | Temperature Difference from Setting Temperature (80° C.) after Holding Time (30 minutes) at 80° C. (° C.) |
|---|---|---|---|
| Example 7 | 10 Parts of Shirasu balloons 80 | 13 | 4 |
| Example 8 | 20 Parts of Shirasu balloons 80 | 13 | 4 |
| Example 9 | 30 Parts of Shirasu balloons 80 | 14 | 4 |
| Comparative Example 5 | No addition of Shirasu balloons | 6 | 0 |

EXAMPLES 10 and 11

Under the condition of Example 1, 10 parts (6.4% by weight in a polyurethane resin moulding) of the microencapsulated PW and 1.44 parts (0.9% by weight in a polyurethane resin moulding) of thermal barrier pigments (AB820) were added to 100 of a polyol mixture in Example 10, and 10 parts (6.4% by weight in a polyurethane resin moulding) of the microencapsulated PW and 1.44 parts (0.9% by weight in a polyurethane resin moulding) of thermal barrier pigments (AG235) were added to 100 of a polyol mixture in Example 11, as shown in Table 7. Each moulding was obtained by the same operations as Example 1. Table 6 shows test results of the examples.

TABLE 6

| No. | Thermal barrier pigments Microencapsulated PW | Temperature Difference from Setting Temperature (80° C.) at Reaching 80° C. (° C.) | Temperature Difference from Setting Temperature (80° C.) after Holding Time (30 minutes) at 80° C. (° C.) |
|---|---|---|---|
| Example 10 | AB820 + 10 Parts of Prethermo C-75 | 14 | 3 |
| Example 11 | AG235 + 10 Parts of Prethermo C-75 | 12 | 5 |

TABLE 7

| No. | Microencapsulated PW | | Thermal barrier pigments | | |
|---|---|---|---|---|---|
| Example 10 | Prethermo C-75 | 10 Parts | Daiwa Chemical Industries Co., Ltd. | AB820 | 1.44 Parts Kawamura Chemical Co., Ltd. |
| Example 11 | Prethermo C-75 | 10 Parts | Daiwa Chemical Industries Co., Ltd. | AG235 | 1.44 Parts Kawamura Chemical Co., Ltd. |

EXAMPLES 12 and 13

Respective thermal barrier coatings having high reflectance in a near-infrared region were applied to surfaces of mouldings in Examples 12 and 13 obtained according to the operations of Example 1 with a thickness of 20 μm, respectively as shown in FIG. 9. Table 8 shows test results of Examples 12 and 13. According to the results, it is recognized that a suppressing effect of a temperature rise is enhanced when the coating material having higher reflectance in the near-infrared region is selected. With regard to Comparative Example 6 in Table 8, a coating material is applied to a moulding not including any of microencapsulated PW, shirasu balloons and thermal barrier pigments.

TABLE 8

| No. | Thermal barrier coating | Temperature Difference from Setting Temperature (80° C.) at Reaching 80° C. (° C.) | Temperature Difference from Setting Temperature (80° C.) after Holding Time (30 minutes) at 80° C. (° C.) |
|---|---|---|---|
| Example 12 | Thermal barrier Planet IMC Type A | 13 | 4 |
| Example 13 | Thermal barrier Planet IMC Type B | 10 | 3 |
| Comparative Example 6 | Planet IMC (No Thermal barrier Agent) | 6 | 2 |

TABLE 9

| No. | Grade of Thermal barrier coating | Coating Material | Thickness | Manufacturer |
|---|---|---|---|---|
| Example 12 | Thermal barrier Planet IMC Type A | Acrylic Urethane | 20 μm | Dai Nippon Toryo Co., Ltd. |

TABLE 9-continued

| No. | Grade of Thermal barrier coating | Coating Material | Thickness | Manufacturer |
|---|---|---|---|---|
| Example 13 | Thermal barrier Planet IMC Type B | Acrylic Urethane | 20 μm | Dai Nippon Toryo Co., Ltd. |
| Comparative Example 6 | Planet IMC (No Thermal barrier Agent) | Acrylic Urethane | 20 μm | Dai Nippon Toryo Co., Ltd. |

EXAMPLE 14

The thermal barrier coating in Example 12 was applied to a surface of the moulding obtained in Example 11. Table 10 shows a test result of Example 14.

EXAMPLE 15

The same operations as Example 1 were repeated except that 10 parts (6.4% by weight in a polyurethane resin moulding) of shirasu balloons with a diameter of 80 μm and 1.44 parts (0.9% by weight in a polyurethane resin moulding) of thermal barrier pigments (AG235) were added to 100 parts of a polyol mixture instead of the addition of the microencapsulated PW, whereby a moulding was obtained. The thermal barrier coating in Example 12 was applied to a surface of the obtained moulding. Table 10 shows a test result of Example 15.

EXAMPLE 16

5 parts (3.2% by weight in a polyurethane resin moulding) of microencapsulated PW of which a melting point was 75° C., 5 parts (3.2% by weight in a polyurethane resin moulding) of shirasu balloons with a diameter of 80 μm and 1.44 parts (0.9% by weight in a polyurethane resin moulding) of thermal barrier pigments (AG235) were added to 100 parts of a polyol mixture, whereby a moulding was obtained by the same operations as Example 1. The thermal barrier coating in Example 12 was applied to a surface of the obtained moulding. Table 10 shows a test result of Example 16.

COMPARATIVE EXAMPLE 7

The same operations as Example 1 were repeated except that 1.44 parts (0.98% by weight in a polyurethane resin moulding) of thermal barrier pigments (AG235) were added to 100 parts of a polyol mixture instead of the addition of the microencapsulated PW, whereby a moulding was obtained. The thermal barrier coating in Example 11 was applied to a surface of the obtained moulding. Table 10 shows a test result of Comparative Example 7.

TABLE 10

| No. | Combination | Temperature Difference from Setting Temperature (80° C.) at Reaching 80° C. (° C.) | Temperature Difference from Setting Temperature (80° C.) after Holding Time (30 minutes) at 80° C. (° C.) |
|---|---|---|---|
| Example 14 | 10 Parts of Prethermo C-75 | 15 | 8 |
| Example 15 | 10 Parts of Shirasu balloons 80 | 14 | 5 |
| Example 16 | 5 Parts of Prethermo C-75 + 5 Parts of Shirasu balloons 80 | 14 | 5 |
| Comparative Example 7 | No Additive | 14 | 1 |

*Combination of shield coating material IMC type A and thermal barrier pigment AG235

[Measurement result of Q-MAX]

TABLE 11

| No. | Additive | Heat Transfer Flow Rate Q-MAX at Bringing Sensor in contact with Sample at Setting Temperature (80° C.) (J/cm$^2$ · s) | Heat Transfer Flow Rate Q-MAX at Bringing Sensor in contact with Sample at Setting Temperature (−10° C.) (J/cm$^2$ · s) |
|---|---|---|---|
| Example 1 | 10 Parts of Prethermo C-75 | 0.909 | 0.903 |
| Example 6 | 5 Parts of Prethermo C-75 + 5 Parts of Shirasu balloons 80 | 0.863 | 0.876 |
| Example 7 | 10 Parts of Shirasu balloons 80 | 0.806 | 0.821 |
| Comparative Example 5 | No Addition of Microencapsulated PW | 1.054 | 1.065 |

According to Table 11, it is recognized that hotness or coldness can be lessened when touching the mouldings due to each inclusion of the microencapsulated paraffin waxes (Example 1), the shirasu balloons (Example 7), and the microencapsulated paraffin waxes and the shirasu balloons (Example 6) in the polyurethane resin mouldings compared with the polyurethane resin moulding of Comparative Example 5. Note that, a passenger can be aware of the differences of hotness and coldness when there is a difference of 0.1 or more in the Q-MAX.

The entire content of a Japanese Patent Application No. P2008-137552 with a filing date of May 27, 2008 is herein incorporated by reference.

Although the invention has been described above by reference to certain embodiments and examples of the invention, the invention is not limited to the embodiments described above and modifications may become apparent to these skilled in the art, in light of the teachings herein.

What is claimed is:

1. A method of manufacturing a polyurethane resin moulding for a vehicle interior part, comprising:
    dispersing microencapsulated paraffin wax particles into at least one of a polyol mixture and a polyisocyanate compound;
    after said dispersing, polymerizing the polyol mixture and the polyisocyanate compound,
    wherein the polyol mixture contains a polyol, a catalyst, a chain extender, and an auxiliary agent, and
    wherein a melting point of a paraffin wax of the microencapsulated paraffin wax particles is 60° C. to 80° C., and a particle diameter of the microencapsulated paraffin wax particles is 10 μm to 100 μm.

2. The method of manufacturing a polyurethane resin moulding for a vehicle interior part according to claim 1, wherein the microencapsulated paraffin wax particles are dispersed into the polyol mixture.

3. The method of manufacturing a polyurethane resin moulding for a vehicle interior part according to claim 1, further comprising dispersing into at least one of said polyol mixture and said polyisocyanate compound, wherein shirasu balloons with a particle diameter of 35 μm to 80 μm is added to at least one of the polyol mixture and said polyisocyanate compound.

4. The method of manufacturing a polyurethane resin moulding for a vehicle interior part according to claim 1, wherein the polyol mixture further contains thermal barrier pigments.

5. The method of manufacturing a polyurethane resin moulding for a vehicle interior part according to claim 1, further comprising:

after the preparation of the polyurethane resin moulding, applying a thermal barrier coating to a surface of the obtained polyurethane resin moulding with a thickness of 10 μm to 100 μm.

6. A polyurethane resin moulding for a vehicle interior part, comprising:

a polyurethane resin;

more than 0 to not more than 28.7% by weight of microencapsulated paraffin wax particles of which a melting point of a paraffin wax of the microencapsulated paraffin wax particles is 60° C. to 80° C.; and more than 0 to not more than 21.5% by weight of shirasu balloons, wherein a particle diameter of the microencapsulated paraffin wax particles is 10 μm to 100 μm.

* * * * *